Figure 1:
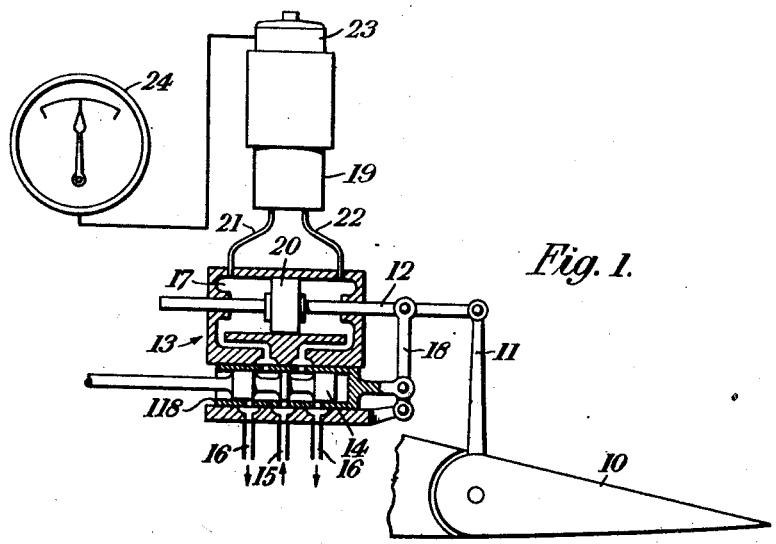

March 19, 1957 C. R. R. EDWARDS 2,786,176
AIRCRAFT CONTROL

Filed Jan. 21, 1953 2 Sheets-Sheet 1

INVENTOR
Cyril R. R. Edwards
By Watson, Cole, Grindle & Watson
ATTORNEYS

March 19, 1957 C. R. R. EDWARDS 2,786,176
AIRCRAFT CONTROL
Filed Jan. 21, 1953 2 Sheets-Sheet 2

INVENTOR
Cyril R. R. Edwards
By Watson, Cole, Grindle
& Watson,
ATTORNEYS

United States Patent Office 2,786,176
Patented Mar. 19, 1957

2,786,176

AIRCRAFT CONTROL

Cyril Roger Robert Edwards, Surbiton, England, assignor to Vickers-Armstrongs Limited, London, England Application January 21, 1953, Serial No. 332,400

Claims priority, application Great Britain January 31, 1952

2 Claims. (Cl. 318—489)

This invention relates to aircraft fitted with power-operated control surfaces. If, in such an aircraft the pilot should wish for any reason to revert from power operation to manual operation of the control surfaces, it is essential that the hinge moments of the control surfaces should be small at the moment of reversion; since otherwise the aerodynamic loads exerted by the control surfaces on the pilot's manual control member will be excessive.

The invention accordingly provides, in an aircraft having a power-operated control surface, the combination with the control surface of a device for measuring the hinge moment of the control surface and mechanism controlled by the measuring device and serving either to give the pilot an indication of the magnitude of the hinge moment or automatically to actuate a trimmer tab or the like on the control surface so as to maintain the hinge moment thereof at a low value.

In the former case, the indicator will give to the pilot or other members of the crew a visual or audible indication of the hinge moment of each control surface, enabling corrective action to be taken by adjustment of the trimmer tabs before reverting from power to manual control. In the latter case, the hinge moment of each control surface will be automatically maintained at a low value, preferably zero or nearly so. In either case safe reversion to manual control is assured.

The invention is especially applicable to hydraulic systems of manual control embodying, in association with the control surface, a hydraulic jack operable by the pilot to set the control surface to a desired position. In this case the measuring device may be constituted by an electrical trim indicator responsive to the out of balance hydraulic pressures imposed by the hinge moment of the control surface on the otherwise static hydraulic pressure prevailing at opposite sides of the jack when the control surface is at rest.

Preferably the trim indicator is constituted by a pair of pressure-sensitive devices each subject through a conduit to the pressure at one end of the jack cylinder, and a linkage system operable by the bellows to move an actuating member in opposite directions in response to excess pressure on one or other of the pressure-sensitive devices, an indicator being provided for showing the magnitude and direction of displacement of the actuating member. Alternatively I may provide a pair of switches arranged to be respectively actuated by a predetermined movement of the actuating member in one or the other direction, and an electric actuator operable in opposite directions by the switches and serving to move a trimmer tab on the control surface to reduce the hinge moment thereof to a low value.

Figure 4:
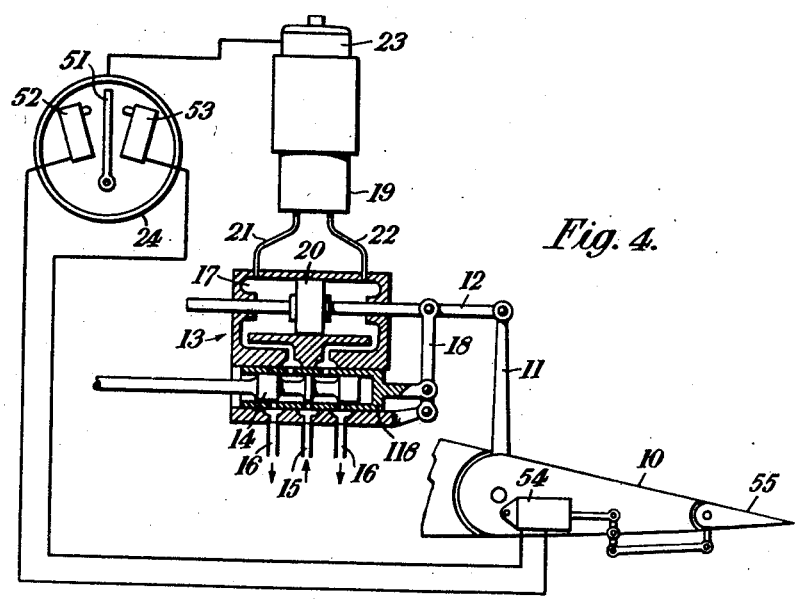
Figure 2:
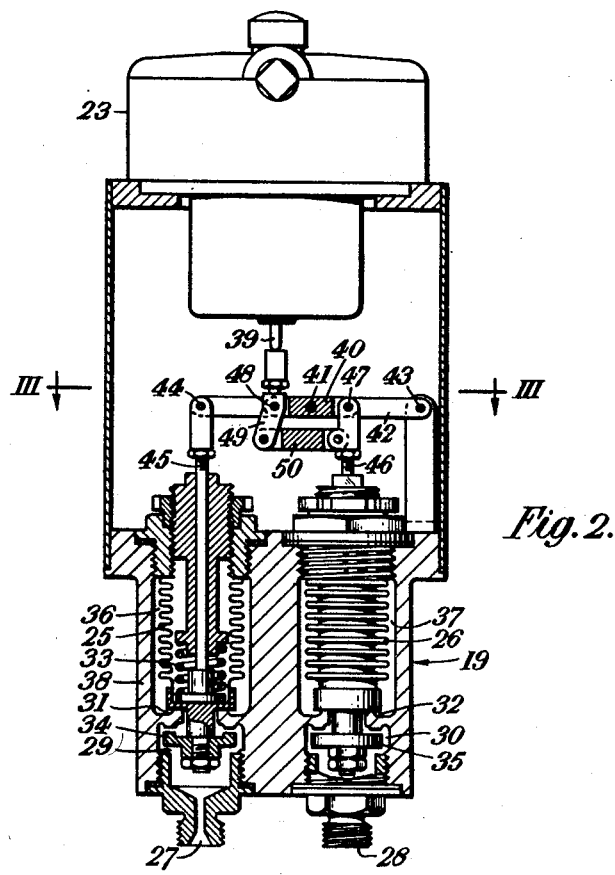
Figure 3:
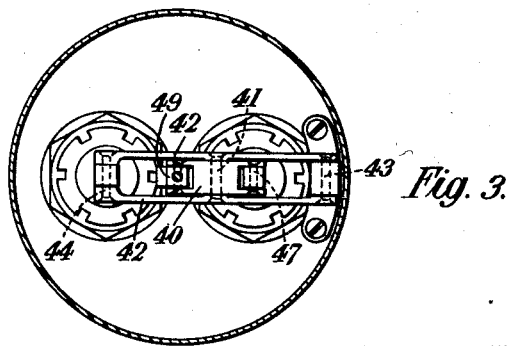

Two specific embodiments of the invention will now be described in detail, by way of example, with reference to the accompanying drawings, in which:

Fig. 1 is a diagram showing the first embodiment, in which an indicator is provided for indicating the hinge moment of a control surface, Fig. 2 is a vertical section through a trim indicator, Fig. 3 is a section on the line III—III in Fig. 2, and Fig. 4 is a diagram similar to Fig. 1 showing the second embodiment.

Like reference characters indicate like parts throughout the figures.

The drawings show the application of the invention to the elevator of an aircraft, but it will be understood that precisely similar mechanism can also be associated with the other control surfaces, namely the rudder and ailerons. Referring first to Figs. 1–3, the elevator 10 of the aircraft is linked by a rod 11 to the piston rod 12 of a hydraulic jack 13 with which is associated a control valve 14. The control valve 14 is movable in conventional fashion by the pilot in opposite directions from the neutral position to effect alternative connections between the pressure inlet 15 and exhaust outlets 16 at opposite ends of the jack cylinder 17, and so to move the elevator 10 to the position selected by the pilot. A follow-up link 18 is provided between the jack piston rod 12 and a ported sleeve 118 surrounding the control valve 14.

The elevator trim indicator 19 is operated by a hydraulic pressure difference across the piston 20 of the jack resulting from a hinge moment exerted by the elevator 10. The pressure difference is communicated by capillary tubes 21, 22 leading one from each end of the jack cylinder 17 to a flexible measuring device which operates a Desynn transmitter 23. This transmitter 23 is electrically connected to a remote and conveniently situated indicating dial 24 which is graduated to indicate the degree to which the trim of the elevator is out of balance.

The measuring device (Figs. 2 and 3) comprises a housing 38 in which are disposed two flexible metal bellows 25, 26. The capillary tubes 21, 22 are respectively connected, by inlets 27, 28 to pressure limiting valve chambers 29, 30 beneath the bellows, and from each such chamber the pressure is applied to the exterior of the associated bellows. When the bellows 25, 26 are in their extended condition their lower ends rest on seatings 31, 32 as shown in Fig. 2. An adjustable preload is applied inside each of the bellows by a spring (shown at 33 in the case of the bellows 25) which ensures that the bellows will remain on its seating under conditions of hydraulic static pressure only.

If the trim of the elevator is out of balance, this is manifested by an increased pressure on one side or other of the jack piston 20 and this pressure serves to compress the bellows subject to the pressure at that end of the cylinder. The pressure on the bellows will exceed safe limits when driving power is applied to the jack and, to avoid damage to the bellows in these circumstances, pressure limiting valves 34, 35 are attached to the bellows, each pressure limiting valve being disposed in the associated valve chamber. Each such valve closes at a predetermined pressure and travel of the bellows to cut off communication between the valve chamber 29 or 30 and the chamber 36 or 37 housing the bellows and so prevent any further increase in pressure from being applied to the bellows. To provide against possible leakage past the valve 34 or 35 with resultant build-up of pressure and possible damage to the bellows, relief valves (not shown) may be provided for connecting the valve chambers 29, 30 to the low pressure side of the hydraulic system.

The bellows 25, 26 are connected to the operating rod 39 of the Desynn transmitter by the following linkage: The linkage comprises an inner short link 40, which is centrally pivoted on a pin 41 carried by a pair of outer long links 42. The long links pivot 42 about a fixed fulcrum pin 43 at one end and are pivoted at the other end 44 to a rod 45 attached to the bellows 25. The rod 46 attached to the bellows 26 is pivoted by a pin 47 to one end of the short link 40. The operating rod 39 of the transmitter is pivoted by a pin 48 to the other end of the short link 40 and also to a linkage system 49, 50 for ensuring parallel motion of the operating rod 39.

Increased pressure of the bellows 26 lifts the right hand end of the short link 40 and so lowers the other end of the link 40 and the operating rod 39 of the transmitter. Increased pressure on the other bellows 25 rocks the long links 42 about their fixed pivot 43 and causes pivotal movement of the short link 40 about its pivot pin 47 in the direction to raise the rod 39 of the transmitter.

The extent of upward or downward movement of the operating rod 39 is shown on the indicating dial 24.

In an alternative arrangement shown in Fig. 4, the pointer 51 of the indicator 24 is movable between a pair of micro-switches 52, 53. When the micro-switch 52 is operated by the pointer 51 a circuit is completed to actuate an electric actuator 54 coupled to a trimmer tab 55 on the control surface, thereby moving the tab 55 in the direction to reduce the hinge moment of the elevator 10 to a low value. When the micro-switch 53 is operated by the pointer 51, an alternative circuit is completed to operate the actuator 54 in the reverse direction, again with the result that the tab 55 is moved in the direction to reduce the hinge moment of the elevator 10 to a low value.

What I claim as my invention and desire to secure by Letters Patent is:

1. A power operated flying control system for aircraft comprising, in combination, a control surface, a pilot's operating member, a hydraulic jack operable by said operating member to impart movement to said control surface and including a piston and cylinder, and a trim indicator including a pair of pressure-sensitive devices, conduits for subjecting said device respectively to the hydraulic pressures prevailing at the two ends of said cylinder, a pair of valve chambers respectively enclosing said pressure-sensitive devices, a pair of pressure limiting valves, allotted respectively to the two valve chambers, for preventing application of excessive hydraulic pressure to said pressure-sensitive devices, an indicator actuating member, a linkage connecting said devices and said member and operable by said devices to move said member in opposite directions in response to excess pressure on one or other of said devices, and an indicator controlled by said member and movable thereby in opposite directions to show the magnitude and direction of displacement of said member.

2. A control system as claimed in claim 1, comprising a pair of switches selectively operable by said indicator in accordance with the direction of its movement, a trimmer tab on said control surface and an actuator operable by said switches to move said trimmer tab in the direction to reduce the pressure difference in said cylinder.

References Cited in the file of this patent

UNITED STATES PATENTS

| | | |
|---|---|---|
| 774,693 | Peterson | Nov. 8, 1904 |
| 2,143,139 | Carlson et al. | Jan. 10, 1939 |
| 2,171,265 | Carlson | Aug. 29, 1939 |
| 2,232,982 | Tank | Feb. 25, 1941 |
| 2,392,381 | Hanson et al. | Jan. 8, 1946 |
| 2,568,719 | Curry | Sept. 25, 1951 |
| 2,626,114 | Alderson | Jan. 20, 1953 |

FOREIGN PATENTS

| | | |
|---|---|---|
| 621,212 | Great Britain | Apr. 6, 1949 |